United States Patent
Bianco

(10) Patent No.: US 10,186,965 B2
(45) Date of Patent: Jan. 22, 2019

(54) CONTROL CIRCUIT WITH HYSTERESIS FOR A SWITCHING VOLTAGE REGULATOR AND RELATED CONTROL METHOD

(71) Applicant: STMICROELECTRONICS S.R.L., Agrate Brianza (IT)

(72) Inventor: Alberto Bianco, Gressan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 97 days.

(21) Appl. No.: 15/159,642

(22) Filed: May 19, 2016

(65) Prior Publication Data

US 2016/0268905 A1    Sep. 15, 2016

Related U.S. Application Data

(63) Continuation of application No. 13/871,809, filed on Apr. 26, 2013, now Pat. No. 9,356,511.

(30) Foreign Application Priority Data

Apr. 27, 2012    (IT) .............................. MI2012A0697

(51) Int. Cl.
| | |
|---|---|
| *H02M 3/158* | (2006.01) |
| *H02M 1/08* | (2006.01) |
| *H02M 3/156* | (2006.01) |
| *H02M 3/157* | (2006.01) |
| *H02M 1/00* | (2006.01) |

(52) U.S. Cl.
CPC ............ *H02M 3/158* (2013.01); *H02M 1/08* (2013.01); *H02M 3/157* (2013.01); *H02M 3/1563* (2013.01); *H02M 2001/0025* (2013.01)

(58) Field of Classification Search
CPC ............ H02M 3/1582; H02M 3/1584; H02M 3/1588; H02M 2001/009; H02M 2001/0012; H02M 2001/0032; H02M 3/33507; H02M 3/156–3/158; H02M 2001/0009; Y02B 70/1466
See application file for complete search history.

(56) References Cited

U.S. PATENT DOCUMENTS

| | | |
|---|---|---|
| 3,647,978 A | 3/1972 | Hill |
| 3,803,487 A | 4/1974 | Iten |
| 5,519,361 A | 5/1996 | Kim |
| 5,841,641 A | 11/1998 | Faulk |
| 6,147,526 A | 11/2000 | Skelton et al. |

(Continued)

*Primary Examiner* — Nguyen Tran
*Assistant Examiner* — Monica Mata
(74) *Attorney, Agent, or Firm* — Seed IP Law Group LLP

(57) ABSTRACT

A control circuit for a switching voltage regulator is configured to receive an error signal representative of a regulator output voltage in relation to a nominal output voltage, and includes a set/reset flip-flop, a hysteresis comparator and a logic circuit. The flip-flop is configured to produce a switching control signal according to logic values at its set and reset terminals. The comparator is configured to produce a set signal at the set terminal when an error signal drops below a first value, and a reset signal when the error signal rises above a second value. The logic circuit is configured to prevent transmission of the reset signal to the reset terminal during a selected minimum time period and to thereafter enable transmission of the reset signal, and further, to produce an alternate reset signal at the reset terminal at the end of the selected maximum time period.

15 Claims, 8 Drawing Sheets

(56) References Cited

U.S. PATENT DOCUMENTS

| | | |
|---|---|---|
| 6,396,251 B2 | 5/2002 | Corva et al. |
| 7,145,317 B1 | 12/2006 | Shah |
| 2005/0001597 A1 | 1/2005 | Walters et al. |
| 2008/0129264 A1 | 6/2008 | Moussaoui et al. |

CONTROL CIRCUIT WITH HYSTERESIS FOR A SWITCHING VOLTAGE REGULATOR AND RELATED CONTROL METHOD

BACKGROUND

Technical Field

This disclosure relates to switching voltage regulators and more particularly to a control circuit with hysteresis adapted to drive a switching power stage of a switching voltage regulator, a relative switching voltage regulator and a method of controlling a switching voltage regulator.

Description of the Related Art

Voltage regulators generate a constant DC output voltage and contain circuits that keep the output voltage on a supplied load at a regulated value. This task is typically accomplished using a switching power stage, the switches of which are turned on/off depending on the logic state of a driving signal produced by a regulator control circuit.

A classic architecture of a feedback switching regulator controlled in constant-on-time (COT) mode is shown by way of example in FIG. 1. It comprises an error amplifier EA that generates an error signal $V_{ERR}$ corresponding to the difference between a feedback signal FB, representing the regulated output voltage Vout, and a reference voltage Vref, a comparator COMP of the error signal $V_{ERR}$ with a threshold Vth, adapted to generate an active flag S when the error signal crosses the threshold. At each active transition edge of the flag S, the monostable multivibrator MON generates a pulse command active for a pre-established time interval Ton that fixes the on-time of the power switches such to power the supplied load.

A more detailed architecture corresponding to that of FIG. 1 is shown in FIG. 2. The error signal $V_{ERR}$ is tied to the output voltage $T_{OUT}$ by the following relation:

$$V_{ERR} = V_{OUT} \frac{R_{o2}}{R_{o1} + R_{o2}} \cdot g_m \cdot (R_C + sC_{INT})$$

and the comparison threshold Vth is given by the following equation:

$$V_{th} = kR_L I_L$$

This known architecture generates overshoots when the load decreases just after a constant on-time pulse is started. As schematically illustrated in the exemplary graph of FIG. 3, an overshoot of the output voltage VOUT occurs because the current requested by the load drops abruptly from about 13 A to about 8 A immediately after a new cycle is started.

In order to reduce this undesired effect, the architecture of FIG. 4 has been proposed in literature. Differently from the architecture of FIG. 1, it comprises a hysteresis comparator COMP with a hysteresis voltage Vhyst and a set-reset latch S/R for determining the on-time of the power stage switches. This solution reduces voltage overshoots because the hysteresis comparator shortens the on-time of the switches of the power stage in case of a reduction of the load.

A power supply controller similar to that of FIG. 4 is disclosed in the published patent application US 2008/0129264 and is shown in FIG. 5. The power-supply controller includes a voltage divider 32, an error amplifier 34, an analog-to-digital converter (ADC) 36, a signal combiner (here an adder) 38 for generating a control signal CONTROL, a low-pass filter 40, a signal generator 42, which generates the switching signal PWM and which includes a hysteresis comparator 44 and a reset-set (R/S) flip-flop 46, and a frequency adjuster 48 for generating a frequency-adjust signal. The error amplifier 34 and the analog-to-digital converter 36 generate an error voltage (Vout−Vref)/X corresponding to the difference between a reference voltage Vref and a feedback voltage representing the regulated output voltage Vout. A frequency adjuster 48 compares the switching frequency of the driving signal PWM, provided to the power stage of the regulator, with a reference frequency Freference and generates a corresponding frequency adjustment signal. An adder 38 combines these two signals and the combination of these two signals is transmitted, via a low-pass filter 40, to a hysteretic comparator 44, that sets or resets a S/R flip-flop 46 that generates the driving signal PWM. In practice, the known control circuit of FIG. 5 adjusts the hysteresis window with which the error voltage (Vout−Vref)/X is compared, in order to take into account transient frequencies of the load.

BRIEF SUMMARY

It has been noticed that when the instantaneous frequency of variation of load transients changes abruptly, the known hysteretic switching regulators tend to function in an uncontrolled manner. This effect is illustrated by the graphs of FIG. 6, that compares the results of simulations carried out using the switching regulators of FIG. 4 and of FIG. 5 when the instantaneous frequency of the current absorbed by the supplied load varies fast in a relatively great interval. With the hysteretic voltage regulator of FIG. 5 the output voltage Vout undergoes to unacceptable overshoots and sudden drops.

The performances of this prior switching regulator may be limited by the fact that the frequency adjuster is intrinsically relatively slow in order to have a hysteretic control of the load.

Studies carried out by the applicant led to identify in the relatively slow capability of adjustment of the bounds of the hysteresis window a cause of the above described undesirable behavior of the known switching regulator of FIG. 4. Unfortunately, there may be working conditions in which the instantaneous frequency of the supplied load fluctuates so fast and in such a great range that the frequency adjuster may be incapable of tracking these fluctuations. Therefore, in presence of short-transient large decreases of the load, the voltage in input to the hysteresis comparator increases and decreases very fast, and this transient causes the S/R flip-flop to turn off the power stage even if the load was to be powered.

In order to prevent this inconvenient, the applicant found expedient to provide the control circuit of the switching regulator with a logic circuit adapted to mask the reset signal of the S/R flip-flop for a minimum time interval after an active edge of a set signal, and to reset the S/R flip-flop after a maximum time interval elapsed from the active edge of the set signal, until the next active edge of the set signal is generated.

According to an embodiment, a control circuit for a switching voltage regulator is configured to receive an error signal representative of a regulator output voltage in relation to a nominal output voltage, and includes a set/reset flip-flop, a hysteresis comparator and a logic circuit. The flip-flop is configured to produce a switching control signal according to logic values at its set and reset terminals. The comparator is configured to produce a set signal at the set terminal when an error signal drops below a first value, and a reset signal when the error signal rises above a second value. The logic circuit is configured to prevent transmission of the reset signal to the reset terminal during a selected minimum time interval and to thereafter enable transmission of the reset signal, and further, to produce an alternate reset signal at the reset terminal at the end of the selected maximum time interval.

According to an embodiment, the logic circuit includes a first monostable multivibrator configured to generate a first null flag for the minimum time interval starting from active edges of the set signal; a second monostable multivibrator configured to generate a second null flag for the maximum time interval starting from active edges of the set signal; and logic gates configured to reset the S/R flip-flop when the reset signal is active and the first flag is not null, or when the second flag is not null.

A switching voltage regulator and a related method of controlling a switching voltage generator are also disclosed.

The claims as filed are integral part of this specification and are herein incorporated by reference.

DETAILED DESCRIPTION

Figure 7:
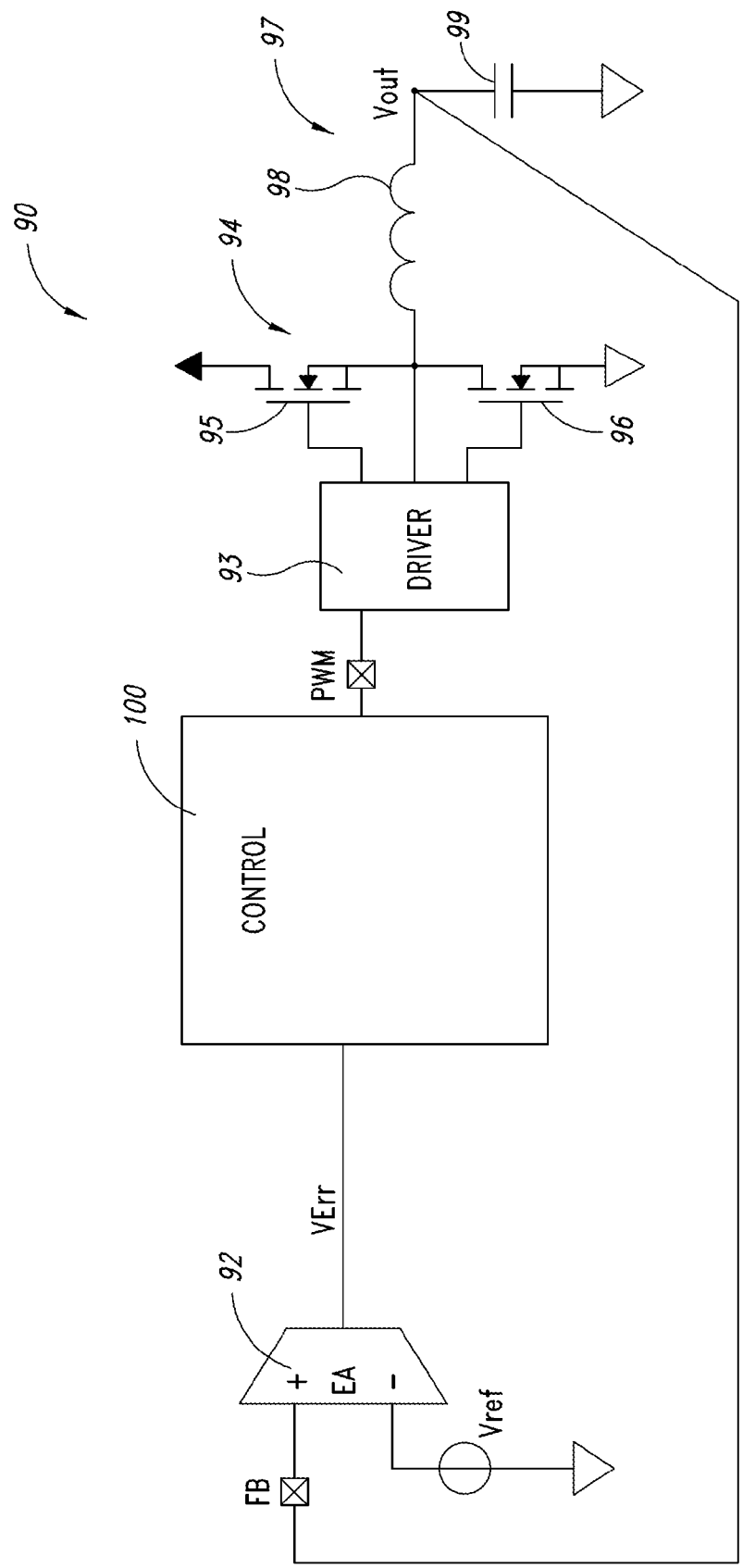
FIG. 7 is a block diagram illustrating a voltage regulator according to one embodiment of the present disclosure.

FIG. 7 is a block diagram illustrating a voltage regulator 90 according to one embodiment of the present disclosure. The voltage regulator 90 includes an error amplifier (EA) 92; a control circuit 100 having an input coupled to an output of the EA 92; a pulse-width modulated (PWM) driver circuit 93 having an input coupled to an output of the control circuit 100; a switching circuit 94 that includes a half-bridge of first and second switching transistors 95, 96, and an LC load circuit 97 that includes an inductance 98 and a capacitance 99.

Figure 8:
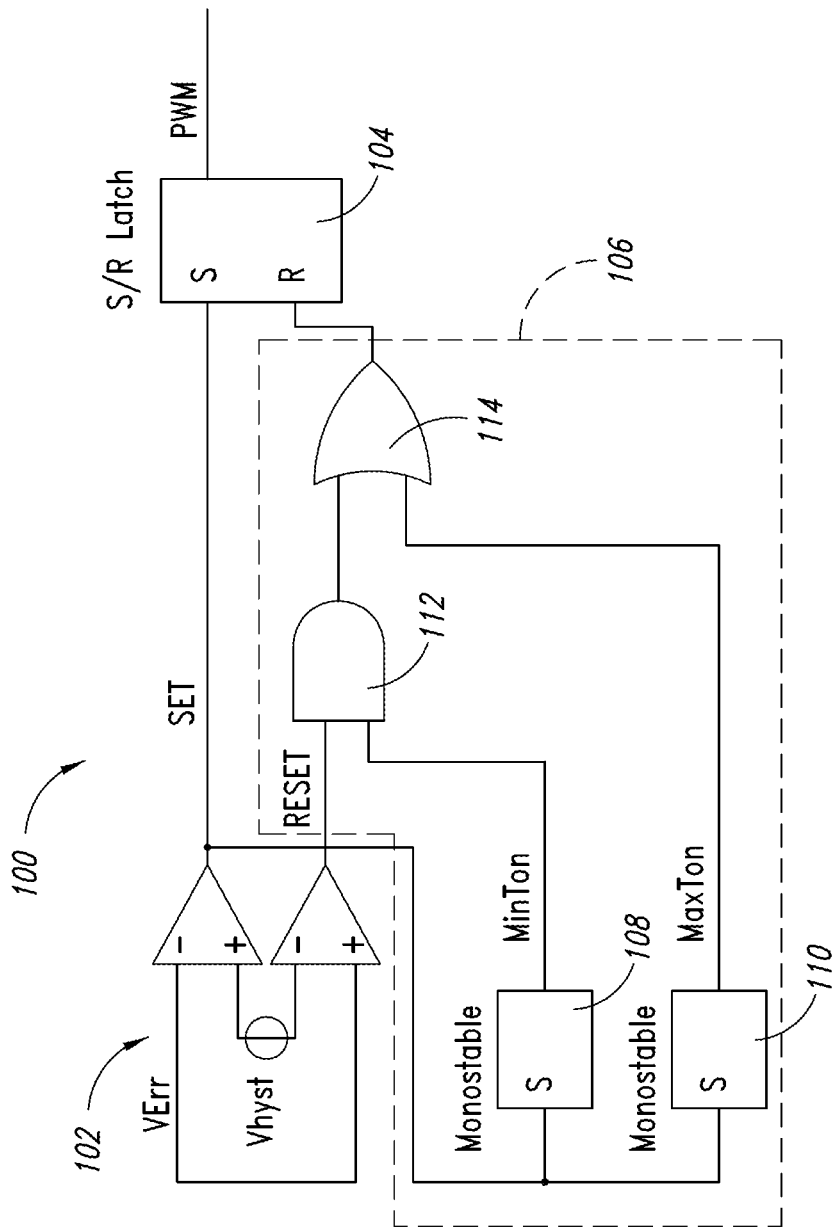
FIG. 8 is a block diagram schematically illustrating a control circuit for a voltage regulator with hysteresis and limitation of the on-time.

An exemplary embodiment of the control circuit 100 with hysteresis of a switching voltage regulator is depicted in FIG. 8. The control circuit 100 is similar in many respects to the circuit described with respect to FIG. 4, and includes a hysteresis comparator 102 and a S/R flip-flop 104. The error signal $V_{ERR}$ is preferably the product of a comparison of a value representative of the output voltage and a reference voltage, and can be obtained, for example, as shown and described with reference to the circuits of any of FIG. 1, 2, 4, or 5.

Figure 1:
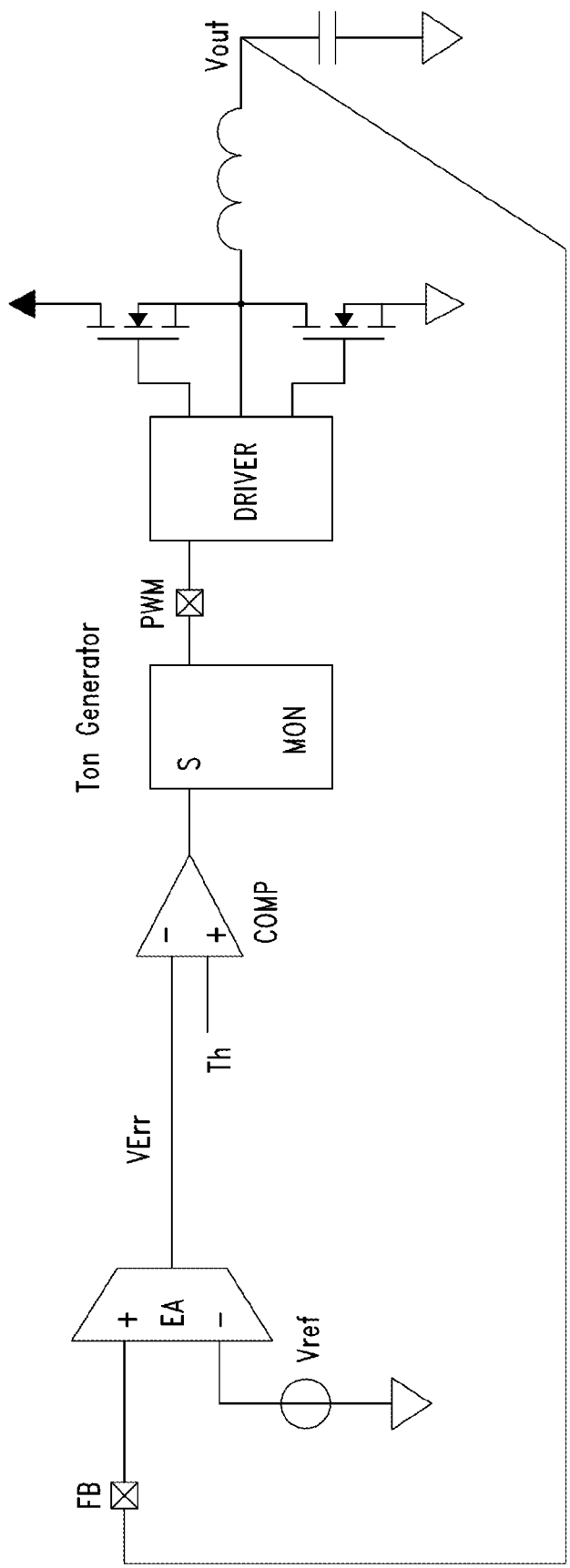
FIG. 1 depicts a known constant-on-time voltage regulator.
Figure 2:
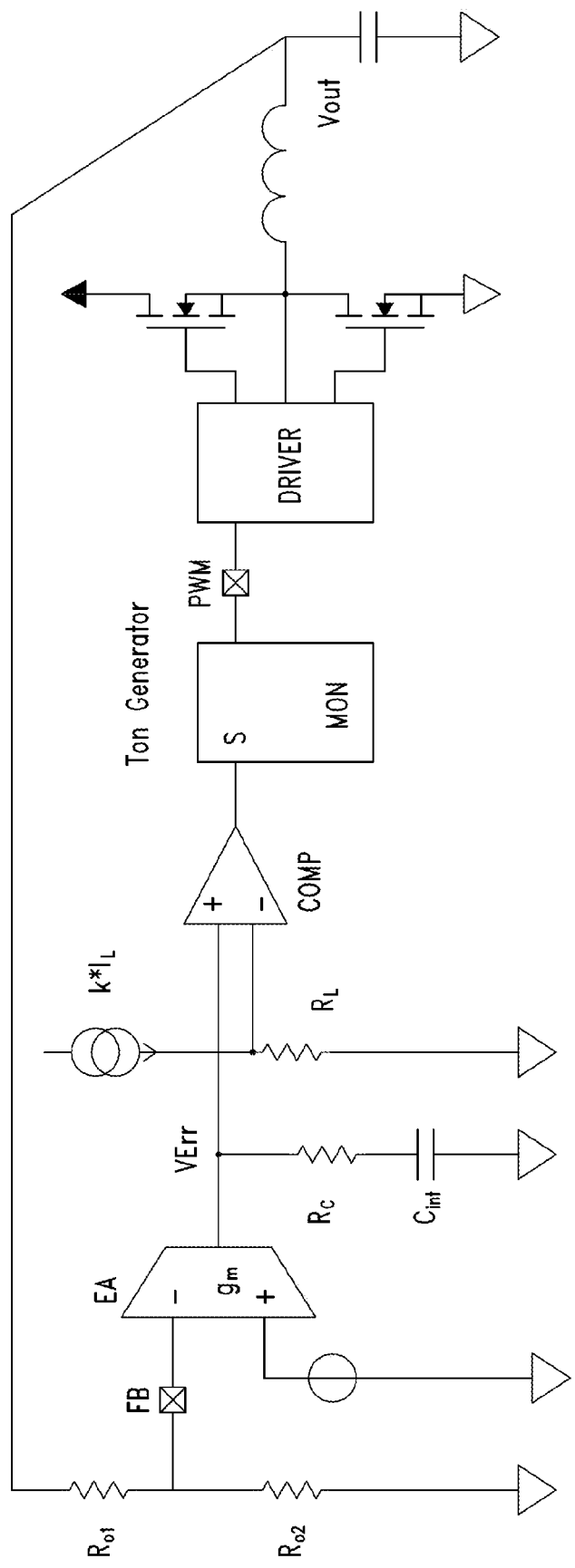
FIG. 2 is a known current mode constant-on-time voltage regulator.
Figure 3:
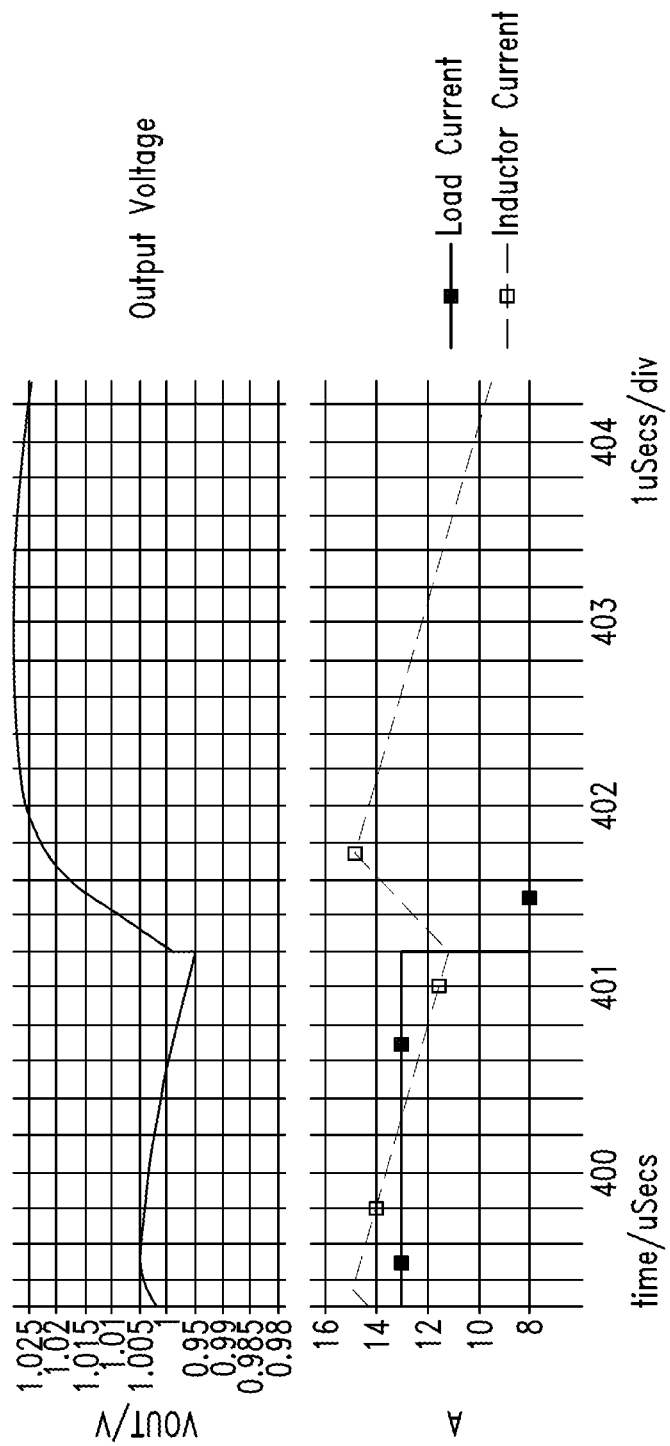
FIG. 3 shows exemplary graphs of simulation of the functioning of the voltage regulator of FIG. 1 in case of abrupt reduction of the supplied load.
Figure 4:
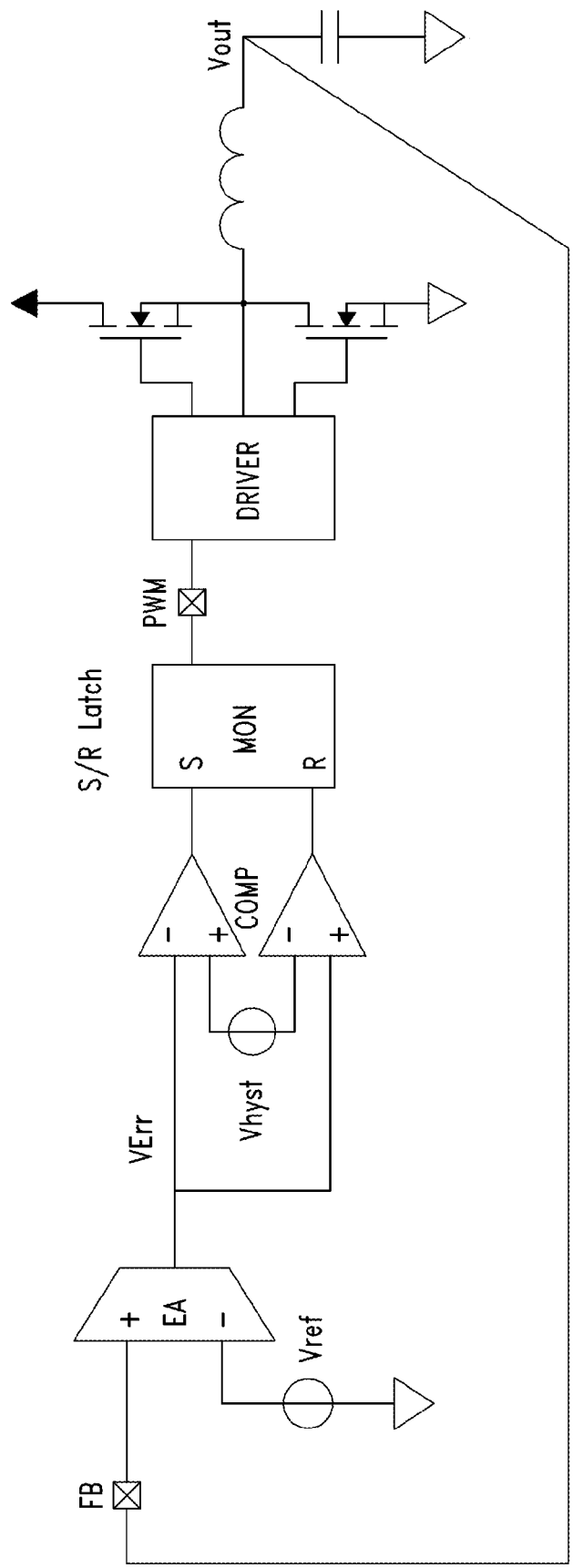
FIG. 4 depicts a known voltage regulator with hysteresis.
Figure 5:
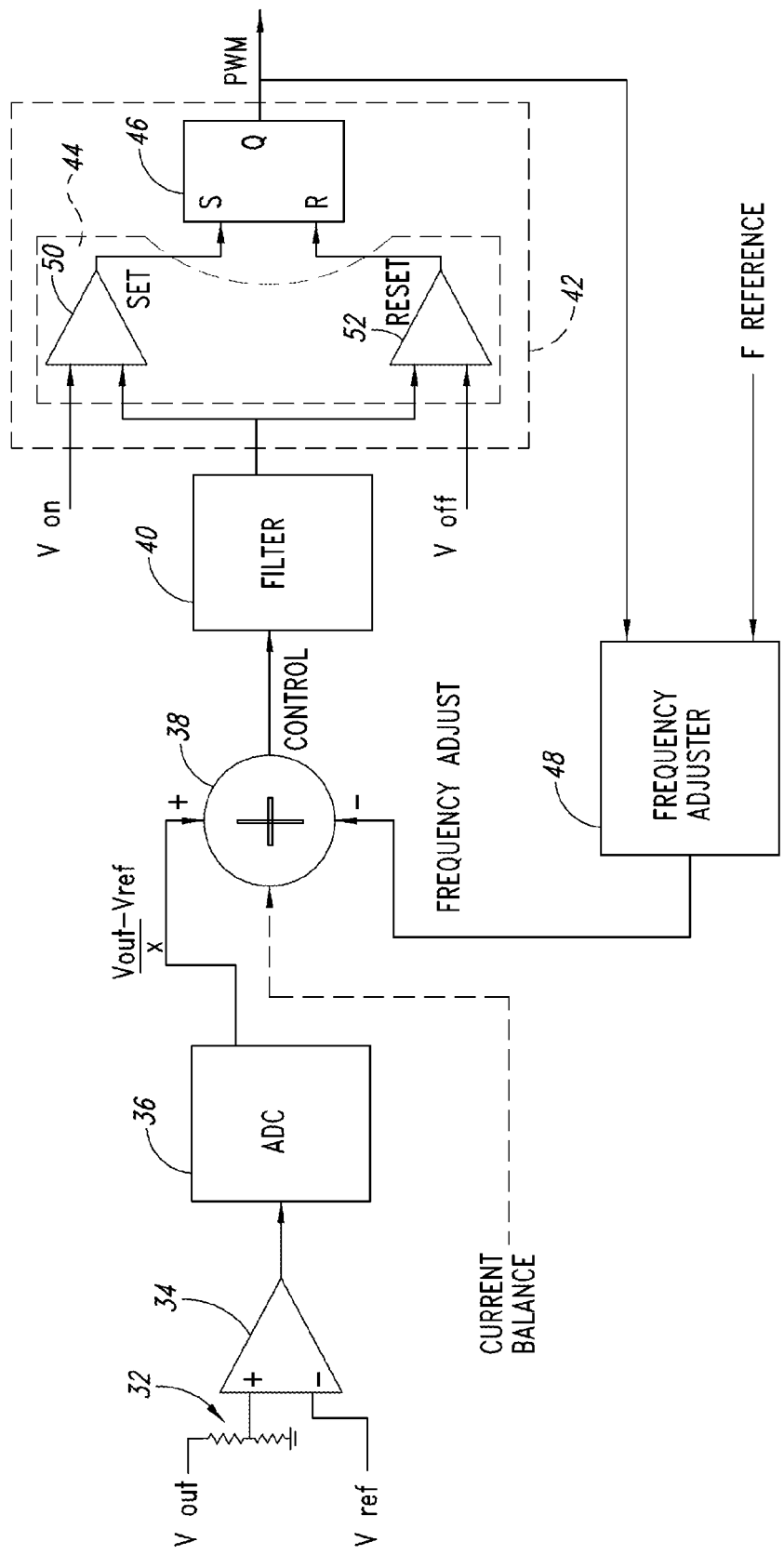
FIG. 5 shows a control circuit of a hysteretic switching voltage regulator disclosed in the document US 2008/0129264.
Figure 6:
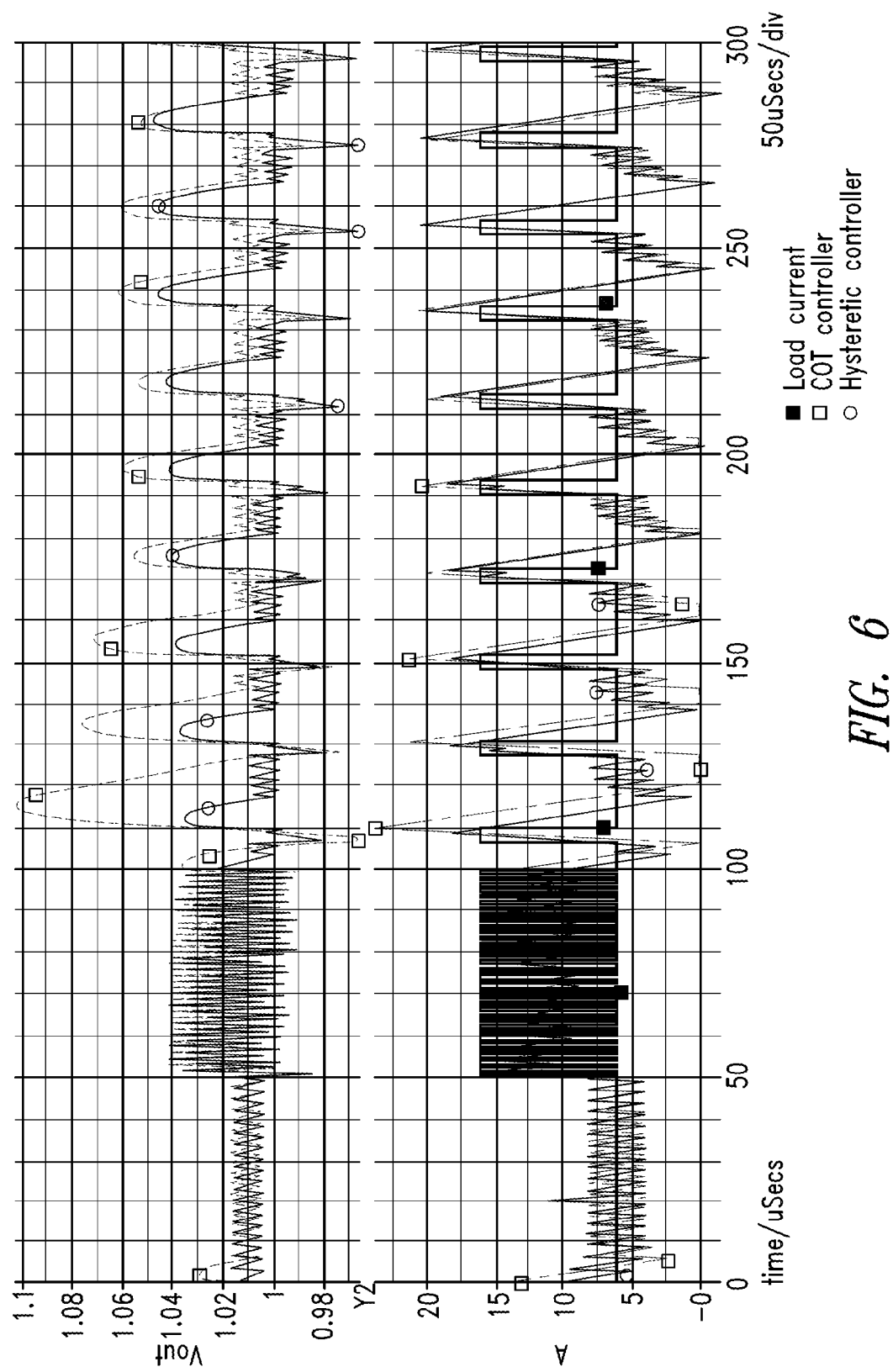
FIG. 6 compares exemplary graphs of simulation of the functioning of the voltage regulators of FIGS. 4 and 5 when the instantaneous frequency of the delivered current varies relevantly during each switching cycle.

Differently from the known architecture of FIG. 4, the control circuit 100 includes a logic circuit 106 configured to block a reset signal R for a selected minimum time interval after an active edge of the set signal, and to force a reset of the S/R flip-flop when a maximum time interval MaxTON has elapsed from an active edge of the set signal S. In practice, the logic circuit 106 makes the supplied load be powered always for at least a minimum time interval MinTON and no longer than a maximum time interval MaxTON when the S/R flip-flop is set. This is done in the embodiment of FIG. 8 using a first monostable multivibrator 108 configured to generate a first null flag for the minimum time interval MinTON starting from active edges of the set signal and a second monostable multivibrator 110 configured to generate a second null flag for the maximum time interval MaxTON starting from active edges of the set logic signal. For the purposes of this description, the first and second null flags can be considered to correspond to a logic 0 value.

In the logic circuit 106, the reset output of the hysteresis comparator 102 and the output of the first monostable multivibrator 108 are coupled to respective inputs of an AND gate 112. The output of the AND gate 112 and the output of the second monostable multivibrator 110 are coupled to respective inputs of an OR gate 114, which in turn has an output coupled to the reset terminal of the S/R flip-flop 104. In this configuration, a reset signal from the hysteresis comparator 102 cannot pass the AND gate 112 while the first flag is null, and thus once set, the S/R flip-flop 104 remains set for at least the minimum time interval MinTON, at which time the first monostable multivibrator 108 resets to a logic 1 state, and the AND gate 112 is enabled to transmit a reset signal from the hysteresis comparator 102. Meanwhile, at the end of the maximum time interval MaxTON, the second monostable multivibrator 110 resets to a logic 1 state, which is transmitted via the OR gate 114 to the S/R flip-flop 104. Thus, if the hysteresis comparator 102 has not produced a reset signal by the end of the maximum time interval, the S/R flip-flop 104 is reset by the second monostable multivibrator 110.

This control prevents an immediate turn off of the power stage due to a transient fast reduction of the load, and ensures that the power stage is turned off even if the hysteresis comparator does not generate a reset signal because of a transient fast increase of the load. According to an embodiment, the on-time of the switching regulator is a percentage of a steady-state on-time, this percentage being adjusted in a pre-established range in order to follow variations of the load and to neglect transient fast fluctuations thereof.

According to an embodiment, the on-time may be adjusted between 50% and 150% of the steady-state on-time, though different percentages may be used depending on the considered application. Preferably, the percentage range will be symmetrical in respect to the steady-state on-time, though an asymmetrical percentage range (for example 60% to 160%) is possible.

As usual in this field, the steady-state on-time TON may be determined using an oscillator that generates a reference switching logic signal at a reference frequency Freference having an active pulse duration equal to TON, by charging a capacitor with a fixed current when the reference signal is active and by discharging the capacitor with the fixed current when the PWM driving signal of the power stage is high. With this technique, the average voltage on this capacitor is proportional to the steady-state on-time TON.

The switching frequency of the PWM driving signal is adjusted by comparing the present TON duration with the steady-state on-time TON: if the present TON duration is greater than the steady-state on-time, the hysteresis window is reduced, otherwise it is increased.

While an exemplary embodiment has been described, it will be recognized that the associated principles can be implemented using other circuits and logic structures. For example, the logic circuit 106 of FIG. 8 includes an AND gate 112 and an OR gate 114. It is well known that identical logic functions can be performed by wide varieties of logic gate types and configurations. Thus, any gate arrangement that functions as the gates described above is considered to be equivalent. Furthermore, the disclosed operation of the logic circuit 106 can be performed using many different arrangements of timers and switches, any of which is considered to be equivalent. Additionally, the disclosed principles can be applied also to switching regulators structured differently from those shown and described above and in the incorporated reference.

The various embodiments embodiment described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit, comprising:
a hysteresis comparator configured to receive an error voltage, generate a first logic signal that becomes logically active when the error voltage is below a lower threshold and, generate a second logic signal that become logically active when the error voltage is above a higher threshold;
a set/reset flip-flop configured to generate a regulator control signal according to logic values assumed by the first and second logic signals; and
a logic circuit configured to receive a first pulse-width modulated (PWM) signal having a first active period representing a minimum time interval that is determined based on a steady-state on-time of a switching cycle of a regulator and that is less than the steady-state on-time of the switching cycle of the regulator, receive a second PWM signal having a second active period representing a maximum time interval that is determined based on the steady-state on-time of the switching cycle of the regulator and that is greater than the steady-state on-time of the switching cycle of the regulator, prevent reset of the set/reset flip-flop by the second logic signal before the minimum time interval has elapsed from an edge of the first logic signal, and ensure reset of the set/reset flip-flop by the end of the maximum time interval from the edge of the first logic signal.

2. The control circuit of claim 1, wherein the minimum time interval is 50% of the steady-state on-time of the switching cycle, and the maximum time interval is 150% of the steady-state on-time.

3. The control circuit of claim 1, wherein said logic circuit comprises:
a first monostable multivibrator configured to output the first PWM signal having a first logic value for the minimum time interval starting from the edge of the first logic signal, and to otherwise output a second logic value;
a second monostable multivibrator configured to output the second PWM signal having a third logic value for the maximum time interval starting from the edge of the first logic signal and to otherwise output a fourth logic value; and
logic gates configured to reset said set/reset flip-flop when the second logic signal is active and the first monostable multivibrator outputs the second logic value, and when the second monostable multivibrator outputs the fourth logic value.

4. The control circuit of claim 1, wherein the logic circuit is configured to set an on-time of the switching cycle of the regulator to be between 50% and 150% of the steady-state on-time.

5. A method, comprising:
controlling a switching voltage regulator that generates a regulated output voltage, the controlling including:
generating an error voltage corresponding to a difference between a reference voltage and a feedback voltage representing the regulated output voltage;
generating first and second logic signals that become logically active, respectively, when the error voltage is below a lower threshold and above a higher threshold;
receiving a first pulse-width modulated (PWM) signal having a first active period signals representing a minimum time interval that is determined based on a steady-state on-time of a switching cycle of the switching voltage regulator and that is less than the steady-state on-time of the switching cycle of the switching voltage regulator;
receiving a second PWM signal having a second active period representing a maximum time interval that is determined based on the steady-state on-time of the switching cycle of the switching voltage regulator and that is greater than the steady-state on-time of the switching cycle of the switching voltage regulator;
masking the second logic signal for the minimum time interval from an edge of the first logic signal;
resetting a set/reset flip-flop if the second logic signal is active after the minimum time interval has elapsed from the edge of the first logic signal, and if not previously reset, then resetting the set/reset flip-flop at the end of the s-maximum time interval from the edge of the first logic signal; and
producing, at an output of the set/reset flip-flop, a regulator control signal that controls the switching voltage regulator.

6. The method of claim 5, wherein the minimum time interval is 50% of the steady-state on-time of the switching cycle and the maximum time interval is 150% of the steady-state on-time.

7. The method of claim 5, further comprising:
for the minimum time interval starting from the edge of the first logic signal, outputting, by a first monostable multivibrator, a first logic value, and otherwise outputting a second logic value; and
for the maximum time interval starting from the edge of the first logic signal, outputting, by a second monostable multivibrator, a third logic value, and otherwise outputting a fourth logic value.

8. The method of claim 7, further comprising:
resetting the set/reset flip-flop when the second logic signal is active and the second logic value is outputted, and when the fourth logic value is outputted.

9. The method of claim 5, comprising adjusting an on-time of the switching cycle of the switching voltage regulator to be between 50% and 150% of the steady-state on-time.

10. The method of claim 5, comprising:
setting the minimum time and the maximum time interval such that an on-time of the switching cycle of the regulator is retained between 50% and 150% of the steady-state on-time.

11. A system, comprising:
a voltage regulator;
a driver coupled to the voltage regulator and configured to control a switching cycle of the voltage regulator based on a regulator control signal; and
a control circuit coupled to the driver and configured to output the regulator control signal to the driver, the control circuit including:
a hysteresis comparator configured to receive an error voltage and to generate a first logic signal that becomes logically active when the error voltage is below a lower threshold and a second logic signal that become logically active when the error voltage is above a higher threshold;
a set/reset flip-flop configured to generate the regulator control signal according to logic values assumed by the first and second logic signals; and
a logic circuit configured to receive a first pulse-width modulated (PWM) signal having a first active period representing a minimum time interval that is determined based on a steady state on-time of the switching cycle of the voltage regulator and that is less than the steady state on-time of the switching cycle of the voltage regulator, receive a second PWM signal having a second active period representing a maximum time interval that is determined based on the steady state on-time of the switching cycle of the voltage regulator and that is greater than the steady state on-time of the switching cycle of the voltage regulator, prevent reset of the set/reset flip-flop by the second logic signal before the minimum time interval has elapsed from an edge of the first logic signal, and ensure reset of the set/reset flip-flop by the end of the maximum time interval from the edge of the first logic signal.

12. The system of claim 11, wherein the voltage regulator includes two switches and wherein the driver controls the switching cycle of the voltage regulator by switching the two switches in accordance with a logical state of the regulator control signal.

13. The system of claim 11, wherein the logic circuit is configured to set an on-time of the switching cycle of the regulator to be between 50% and 150% of the steady-state on-time.

14. The system of claim 11, wherein the minimum time interval and the maximum time interval are set such that an on-time of the switching cycle of the voltage regulator is between 50% and 150% of the steady-state on-time.

15. The system of claim 11, wherein said logic circuit comprises:
a first monostable multivibrator configured to output the first PWM signal having a first logic value for the minimum time interval starting from the edge of the first logic signal, and to otherwise output a second logic value;
a second monostable multivibrator configured to output the second PWM signal having a third logic value for the maximum time interval starting from the edge of the first logic signal and to otherwise output a fourth logic value; and
logic gates configured to reset said set/reset flip-flop when the second logic signal is active and the first monostable multivibrator outputs the second logic value, and when the second monostable multivibrator outputs the fourth logic value.

* * * * *